United States Patent [19]

Rowland

[11] Patent Number: 4,774,589
[45] Date of Patent: Sep. 27, 1988

[54] OPTICAL SYSTEM IMAGE STABILIZER EMPLOYING ELECTROMECHANICAL TORQUE SENSORS

[76] Inventor: David A. Rowland, 2717 Hillegass Ave., Berkeley, Calif. 94705

[21] Appl. No.: 835,461

[22] Filed: Mar. 3, 1986

[51] Int. Cl.$^4$ .............................................. H04N 3/14
[52] U.S. Cl. ...................................... 358/222; 358/229
[58] Field of Search ................. 358/222, 229, 108, 225

[56] References Cited

U.S. PATENT DOCUMENTS

| | | | |
|---|---|---|---|
| 3,518,372 | 6/1970 | Johns | 358/222 |
| 3,858,228 | 12/1974 | Mito | 354/293 |
| 4,040,087 | 8/1977 | Hall | 358/222 |
| 4,158,488 | 6/1979 | Gottschalk | 352/243 |
| 4,158,489 | 6/1979 | Gottschalk | 352/243 |
| 4,158,490 | 6/1979 | Gottschalk | 352/243 |
| 4,206,983 | 6/1980 | Nettman et al. | 352/243 |
| 4,394,075 | 7/1983 | Brown et al. | 352/243 |
| 4,474,439 | 9/1984 | Brown | 352/243 |
| 4,623,930 | 11/1986 | Oshima et al. | 358/222 |

OTHER PUBLICATIONS

Society of Motion Picture and Television Engineers, 87:587-591, "Steadicam as a Design Problem" by J. Jurgens, 1978.

Industrial Photography, Mar. 1980, pp. 44-64, Product Profile: "Steadicam Film/Video Stabilizing System" by Hal Denstman.

Industrial Photography, Jan. 1984, pp. 10-55, In Motion: "Going Steady" by James Manilla.

Primary Examiner—Jin F. Ng
Assistant Examiner—Stephen Brinich
Attorney, Agent, or Firm—Ciotti, Murashige, Irell & Manella

[57] ABSTRACT

An image stabilizer for optical systems is disclosed as are its use with optical systems and its combination with such systems. The stabilizer measures the torque applied to the visual system about an axis and applies a reactive countertorque. More than one such device can be employed to stabilize along more than one axis.

15 Claims, 6 Drawing Sheets

OPTICAL SYSTEM IMAGE STABILIZER EMPLOYING ELECTROMECHANICAL TORQUE SENSORS

BACKGROUND OF THE INVENTION

1. Field of the Invention

This invention relates to an apparatus which stabilizes an operator-held optical system against rotational vibration and thus improves the steadiness of the optical image produced by the system. The stabilizer finds application with cameras, binoculars, sighted hand weapons and other operator-held optical devices.

2. Background Information

Optical devices such as motion picture, video and still cameras, binoculars, telescopes and sighted hand weapons must be held steady when in use. One way to accomplish this is to mount the optical device on a tripod or other rigid structure. Many times, however, it is desirable that the optical device be freely mobile, for example for hand-held operation. As many optical devices are becoming increasingly miniaturized, there is a trend toward this mobile mode of operation. In such settings the device can be moved and rotated but will be subject to undesirable rotational vibration in all three axes. This vibration or "shake" exhibits itself as an unsteady image that becomes more pronounced at extreme conditions of magnification and the like.

Various mechanisms have been described for reducing this vibration while allowing mobility. U.S. Pat. Nos. 4,158,488, 4,158,489 and 4,158,490, issued on June 19, 1979, to Gottschalk describe a body harness mount for motion picture cameras which employs pneumatic cushions to damp unwanted movements of the camera. U.S. Pat. No. 4,206,983, issued June 10, 1980, to Nettman et al, shows a harness type mobile camera stabilizing mount which relies upon positioning the weight of the camera low on the operator's hips to minimize shake. U.S. Pat. No. 4,394,075, issued July 19, 1983, to Brown et al, relies upon an operator harness torso mounting of the camera and a flexible camera support arm to damp vibrations. U.S. Pat. No, 4,474,439, issued Oct. 2, 1984, to Brown, describes camera stabilizing systems known in the motion picture trade as the "Steadicam" system. Steadicam was described in the SMPTE Journal, 87:587–91, Summer 1978. It was also discussed in Industrial Photography, issues of March 1980 and January 1984.

The Steadicam uses an arm with "lazy daisy" linkages which is connected at one end to the camera platform and at the other to a vest worn by the operator. This gives the camera free motion as the arm extends or retracts but does not allow it to rotate. Effectively, the operator's body is the base of a "tripod". Further, the arm contains springs that transfer the weight of the camera to the vest and let the operator's arm direct the camera without supporting it.

These stabilizers are expensive and cumbersome and unsuited for the miniature scale equipment increasingly being used professionally and the small cameras and the like commonly used by amateurs.

U.S. Pat. No. 3,858,228, issued Dec. 31, 1974, to Mito, describes a stabilizing unit of a size applicable to small cameras. The Mito device employs one or more gyroscopes to stabilize the camera. Such a system is not ideal. Gyroscopes are expensive and must be highly precise if they are not to contribute vibrations of their own. They take appreciable time to reach their useful rate of rotation. Moreover, rather than merely damping vibration, they lock the camera in a set direction such that to move the camera to another direction, that is to adjust the angle to which the camera is aimed, the camera must be decoupled from the gyroscopes and then reclamped or the gyroscopes must be temporarily stopped. This interferes with adjustments or with panning of the camera.

It is an object of this invention to provide a mechanism for stabilizing an optical system such as a camera, which mechanism is compact and permits panning and aiming of the optical system.

STATEMENT OF THE INVENTION

A small stabilizing mechanism for portable optical systems has now been discovered. This mechanism includes a sensor that can be affixed to the optical system to detect vibration of the optical system about an axis and when so affixed can generate an electrical signal related to the detected vibration. The mechanism also includes an electric motor affixed to the optical system and capable of rotating a mass about the axis, and a controller which measures the electrical signal from the sensor and directs the motor to rotate the mass so as to counteract the vibration detected by the sensor, thereby stabilizing the optical system. A plurality of such mechanisms can be employed simultaneously to stabilize vibration about several axes. In another aspect, the mechanism can provide a frame or bracket to which the sensor and the electric motor are attached and to which the camera or other optical system is affixed.

In a further aspect, this invention provides a stabilized optical system comprising an optical system in combination with one or more of this stabilizing mechanisms.

In another aspect, this invention provides a method of stabilizing an optical system against vibration about an axis comprising the steps of a. detecting vibration of the optical system about the axis and generating an electrical signal related to the detected vibration, and b. using the electrical signal so generated to direct an electric motor affixed to the optical system with its shaft parallel to the axis to rotate a mass so as to counteract the vibration detected by the sensor.

DETAILED DESCRIPTION OF THE INVENTION

Brief Description of the Drawings

In this specification, reference will be made to the drawings in which.

Description of the Preferred Embodiments

Figure 1:
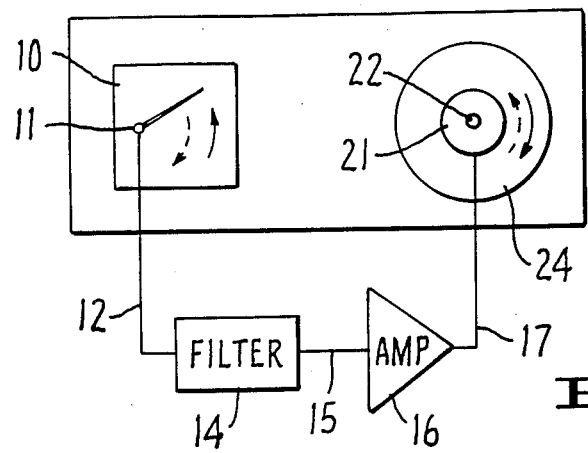
FIG. 1 is a block diagram illustrating the major components of the stabilizer of the invention.

Torque is the force that produces angular acceleration. Rotational vibrations are caused by oscillations of torque. The present invention provides a mechanism which senses the torque applied to it and generates an opposite torque. The net torque applied to the device is reduced and thus so are rotational vibrations.

In the present invention torque is sensed by the motion it produces in an electromechanical sensing device like a meter movement or motor. The signal generated by this sensor, usually after amplification, is used as a control signal for a motor which can turn a mass. The torque produced by turning this mass opposes the original torque.

Both sensor and motor are fixed to a frame. If a torque is applied to the frame, say in the counterclockwise direction (CCW), the frame will begin to rotate. The sensing element, for example a needle in a meter movement, because of its inertia will tend to remain pointed in the same direction. Relative to the frame, it moves clockwise (CW). This generates a signal which is applied to the filter and amplifier and then to the motor and its associated reaction mass. The polarity of the signal is such that the motor drives the reaction mass CCW, which produces a reaction torque CW against the frame, opposing the originally applied torque.

The moving part of the sensor and the reaction mass should be both balanced about their axes of rotation so that they sense and produce rotational motion only. This creates a feedback loop made up of electrical and mechanical elements which automatically adjusts the reaction torque so that it is substantially equal to the applied torque, bringing the net torque to substantially zero. A high-pass filter is generally present in the electrical section of the loop which allows one to suppress reaction to sensed torque of very low frequencies. This permits normal panning of the optical system with no reaction by the mechanism.

One such mechanism suppresses rotational vibration about one axis. Two or three such mechanisms, mutually perpendicular, will suppress vibrations about two or three axes.

Electrical power is employed to drive the motor and amplifier. The stabilizing action may be instantly switched off and on by placing a switch between the sensor and the preamplifier to disconnect and connect the signal. This switch may be controlled by a switch controlling the device being stabilized. Stabilization would occur only during times when the device is in use, not when it is idle.

This device is like an inertial quidance platform except that absolute stability is not sought. In fact, it is undesirable, since a camera must be free to turn when desired. It serves to reduce rotational vibration of frequencies in the range of from about 1 Hz to about 30 Hz. The components needed are simple and light in weight. Only the reaction mass needs to be at all massive. Not using gyroscopes is an advantage. The device can be activated and deactivated instantly and the components are simpler.

This device would not replace the Steadicam type devices since it does not support the camera. It might augment such devices. Its best use is in connection with small video and movie cameras, binoculars, small telescopes, still cameras when used for long exposures while hand-held, rifles and other hand-held weapons. It can be designed into the object or provided as a separate unit to be attached to the device to be stabilized.

Turning now to the drawings, FIG. 1 shows in block diagram form the stabilizer mechanism of the invention. This stabilizer includes a sensor 10 which detects vibration about an axis 11 and generates an electrical signal related to the vibration so sensed. Examples of such sensors are a meter movement and a small permanent magnet motor with a balanced mass attached to its rotor and able to rotate freely such that when the body of the meter or of the motor moves, it moves relative to the needle or shaft and produces a voltage.

The signal from sensor 10 is passed through line 12 to optional filter 14, which permits signals having a frequency corresponding to a rate of rotation of greater than about 2 radians per second to pass and which removes slower rotations, as would result from normal aiming and/or panning of the optical system. Also, preferably, high frequencies, above the time constant of the motor, should also be suppressed to reduce positive feedback which may develop through the frame.

The filtered signal is passed through line 15 to amplifier 16. Amplifier 16 functions as a motor controller in that the resulting amplified signal is used to direct a flow of current to motor 21 to drive motor 21. Motor 21 has a shaft 22 which is parallel to shaft 10 and drives a mass 24 in counterrotation to the rotation sensed by sensor 10. The chassis of motor 24 and the base of sensor 10 are mechanically joined such as by a frame such that the counterrotation of mass 24 directly opposed the originally applied torque sensed by sensor 10.

The sensor must have minimal friction to make it sensitive to the smallest motions. The mechanical coupling between the sensor and reaction motor must be tight so that the feedback loop is properly closed. The electrical time constant of the motor must be small enough that the highest frequencies of interest can be damped. Typical small industrial motors have an electrical time constant on the order of 1 millisecond or less, which is about 10 times better than needed for this application.

Figure 2:
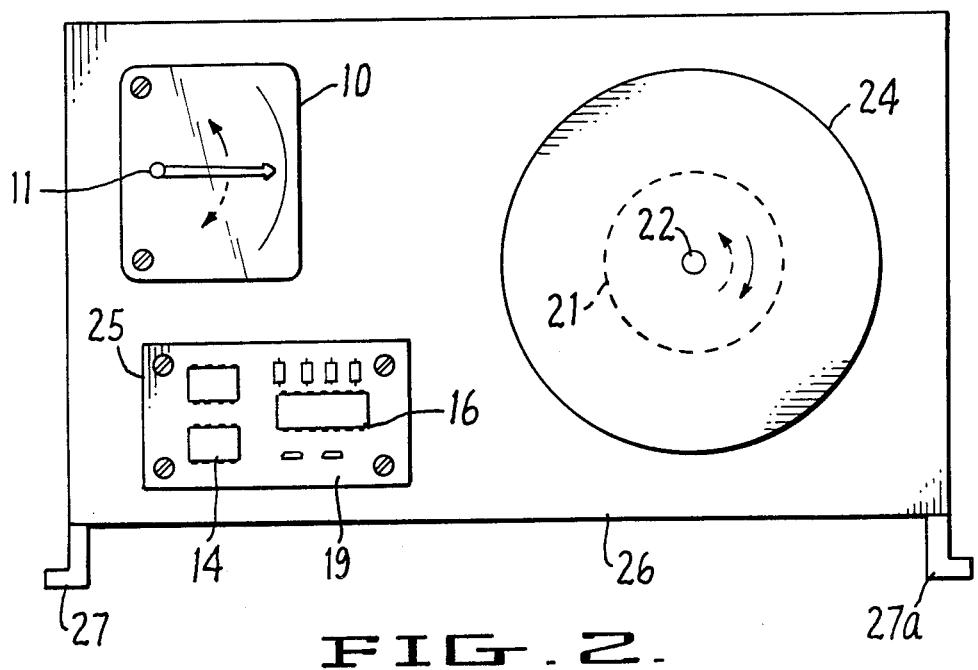
FIG. 2 is a side view of a bread-board version of a stabilizer of this invention.
Figure 3:
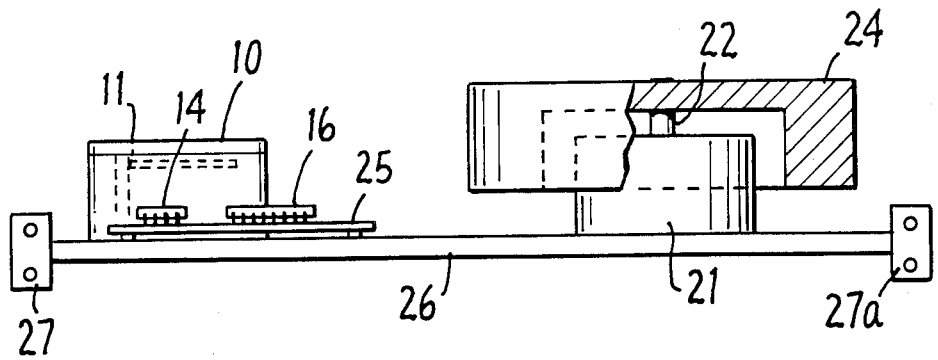
FIG. 3 is a bottom view of the stabilizer of FIG. 2, FIGS. 4 and 5 are circuit diagrams of one embodiment of the electronic control circuit for the stabilizer of this invention.

FIGS. 2 and 3 depict side and bottom views respectively of a "bread board" embodiment of the stabilizer mechanism of the present invention. In this embodiment sensor 10 is shown as a meter movement having a pivot shaft 11. Filter 14 and amplifier 16 are shown incorporated into printed circuit boards 25. Motor 21 and sensor 10 are each fastened to frame 26, and this frame has brackets 27 and 27A which permit the frame to be affixed to the optical system being stabilized. Shafts 11 and 22 are essentially parallel and this mechanism would damp vibration of an optical system to which it was attached about the axis of these shafts.

Figure 4:
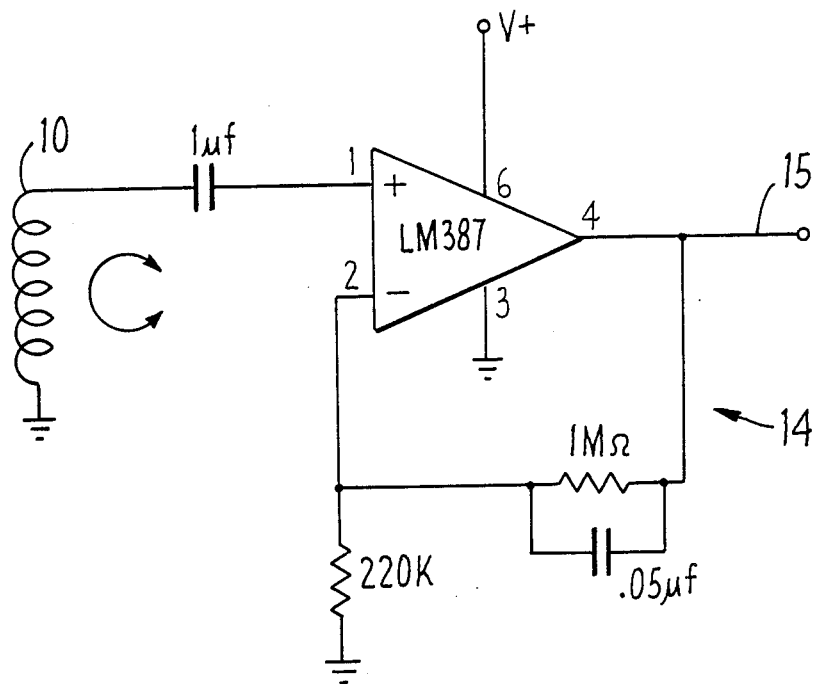
Figure 5:
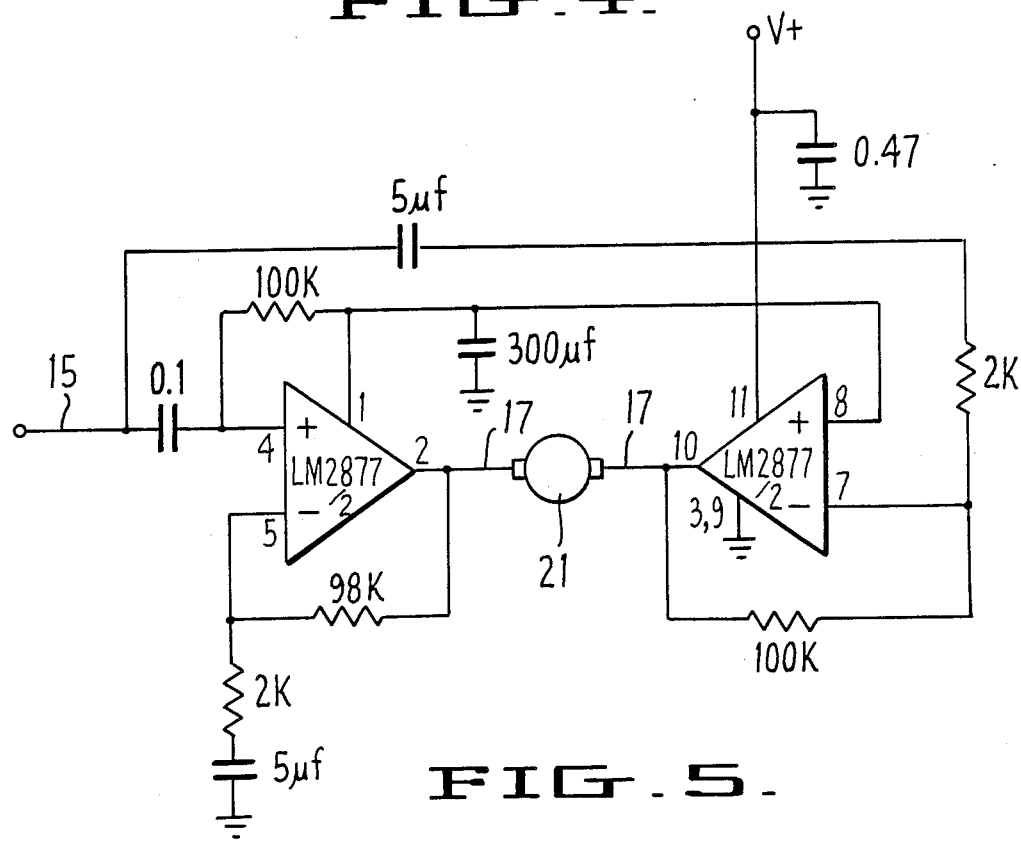

Turning now to FIGS. 4 and 5, representative circuitry of the mechanism of this invention is depicted. Rotation sensor 10 is coupled through a capacitor to a preamplifier such as the LM 387 device shown. The output of this stage is filtered by 14 which is shown as a capacitor/resistor filter. This output is passed through line 15 to an amplifier such as one incorporating an LM2877 device, and this amplified output is passed through line 17 to motor 21 to cause it to rotate in reaction to the signal provided by detector 10.

The amplifier may be any design that can produce sufficient power to drive the motor and which has sufficient gain at the frequencies of interest, about 1 Hz to 20 Hz.

The filter is used to limit the action of the stabilizers at low frequencies, thereby allowing the optical system to move slowly from one angle to another, and at high frequencies, preventing positive feedback that might occur because of flexibility in the mechanical coupling between motion detector and reaction motor. It may also be desirable to include in the filter action a way automatically and temporarily to open the feedback loop, ceasing the stabilizing action, when a sufficiently large motion occurs. This could be a convenience to the operator in some circumstances.

The circuits shown are one possible embodiment of these functions.

Figure 6:
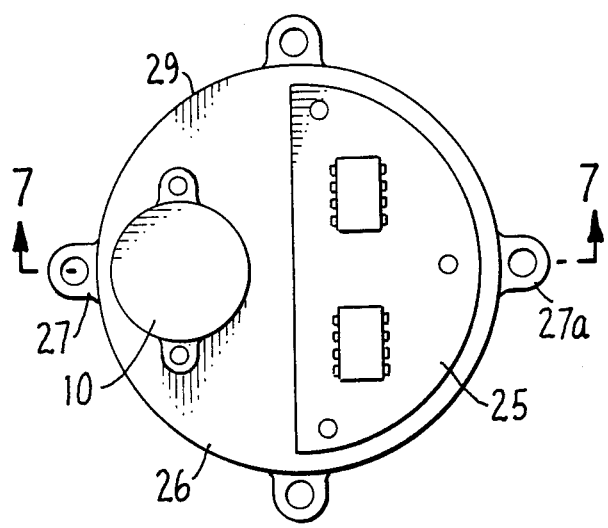
FIGS. 6 and 7 are a top view and a cross-section of another embodiment of the stabilizer of this invention.
Figure 7:
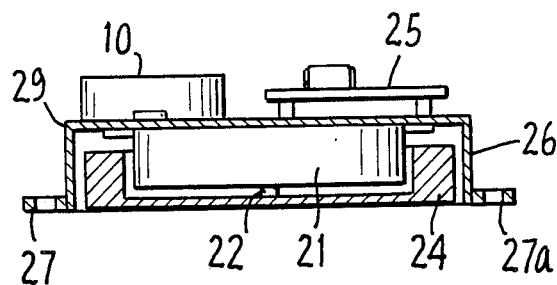

In FIGS. 6 and 7 a more compact embodiment 29 of the stabilizer of this invention is shown, FIG. 7 being a cross-section of the device as shown in FIG. 6. Motor 21 is a bidirectional, DC, permanent-magnet type motor. If one posits the object as being stabilized as a sphere of 1.0 Kg mass and 5 cm in radius, then the moment of inertia is $2/5\ mr^2$, or 10000 gm $cm^2$. A typical (bad) vibration to be suppressed would be $+-5$ degrees at a frequency of 5 Hz. This is an angular acceleration of about 86 rad/$sec^2$ ($w^2 5\ pi/180$). The torque that produces this is 860000 gm $cm^2$/sec or 12 ounce-inches. This is a ballpark figure for the necessary maximum torque to be produced by the drive motor.

The instantaneous peak angular velocity of the reaction mass is given by vel =accel/freq=860000/1/5 in our example, where 1 is the angular momentum. If the reaction mass is a metal ring 1 cm thick and 3 cm in radius, 1 will be about 1350 gm/$cm^2$. The peak velocity will be about 127 radians per second, or 1200 rpm. This is well within the operating range of small motors.

Figure 8:
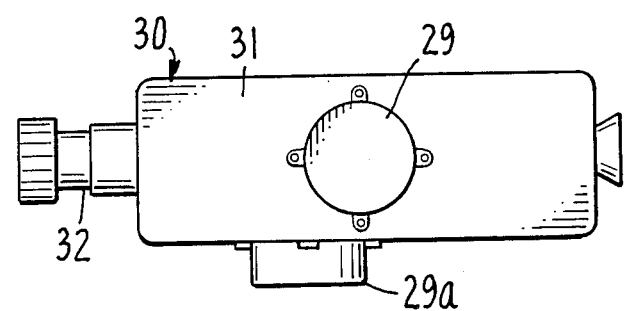
FIGS. 8 and 9 are a top view and a side view of a typical optical system, in this case a video camera, employing the stabilizer of this invention.
Figure 9:
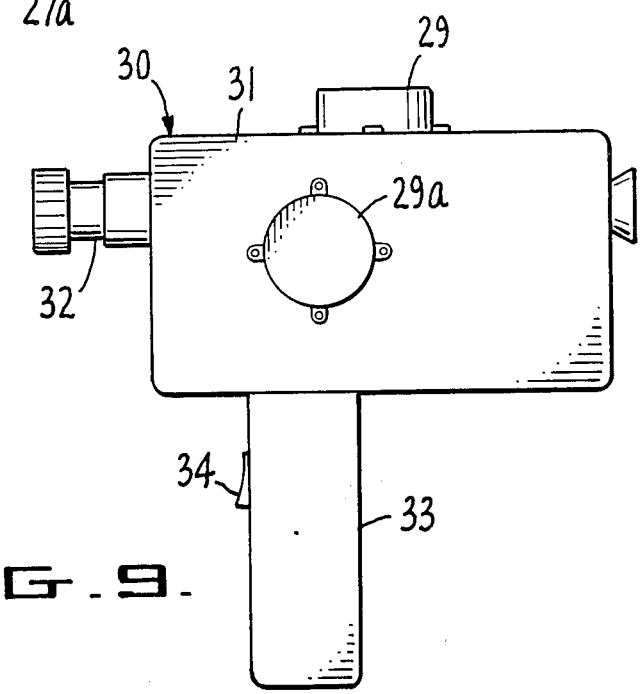

As shown in FIGS. 8 and 9 one or more of these stabilizers 29 and 29A can be mounted on an optical device, such as a video camera 30. Camera 30 includes lens 32 and body 31 with houses the rest of the optical system which is not shown. Stabilizer 29 is positioned on the top of camera 30 so as to provide stabilization about the vertical axis (the "yaw" axis) while stabilizer 29A provides stabilization about the "pitch" axis. If desired, a third stabilizer could be positioned on the front or rear of the camera to give stabilization in that direction, as well. Electrical power as needed to operate the stabilizers can be delivered to them through a cable from an external source (not shown), which may be the power source for the camera and may be switched on and off along with the camera. Alternatively, the stabilizer may contain its own power in the form of batteries. Camera 30 additionally provides a handle 33 which contains a switch 34. Switch 34 activates video camera 30 and, as noted, can activate the stabilizers 29 and 29a as well when it is depressed.

Figure 10:
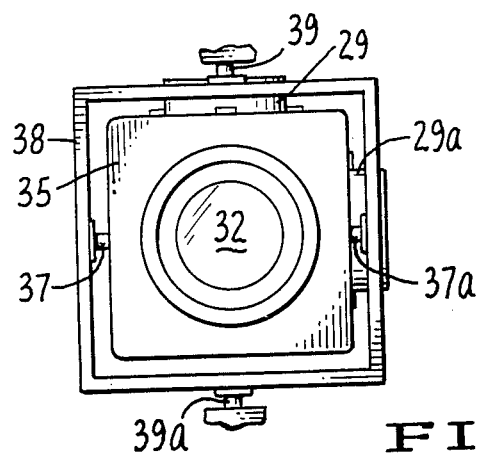
FIGS. 10 and 11 depict a variation of the stabilizer and its use in connection with the isolated optical train of a video camera.
Figure 11:
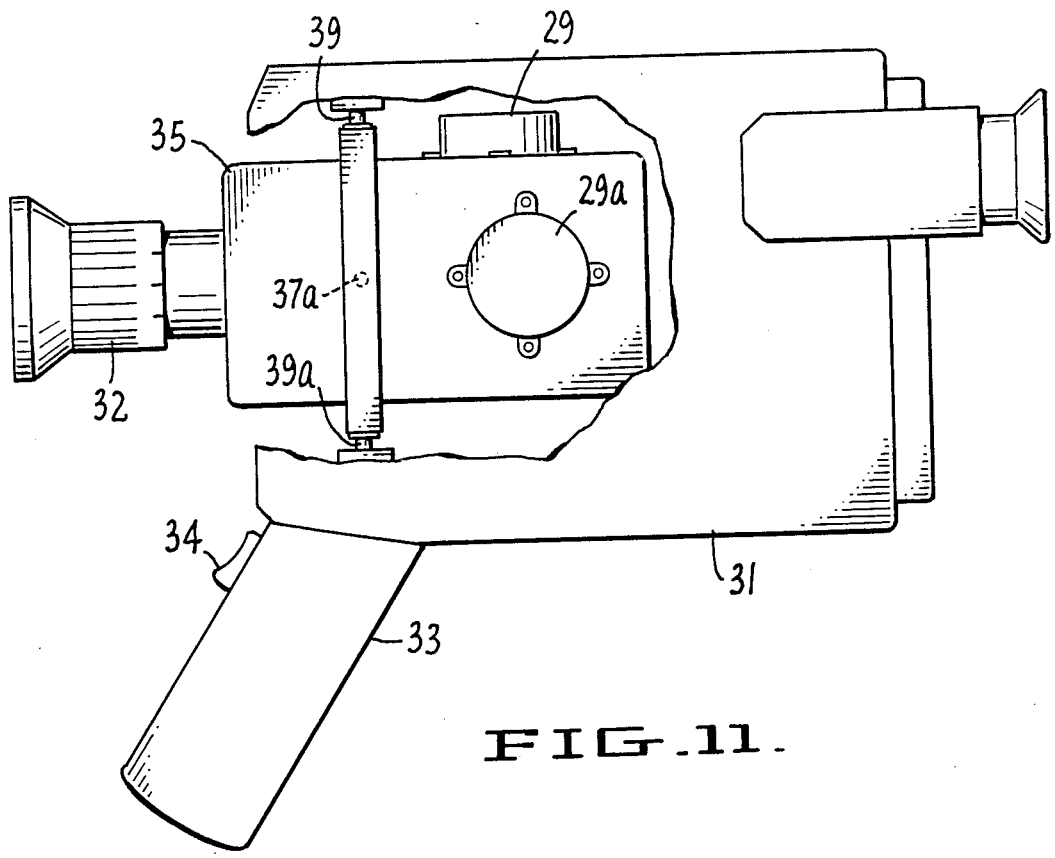

As will be appreciated, in the embodiment just depicted, stabilizers 29 and 29a are serving to stabilize the entire mass of camera 30, including its case, handle 33, and the like. It is in fact only necessary to stabilize the optical system itself. This can be accomplished by pivotably suspending the optical system within the camera and affixing the stabilizers to the suspended optical system. FIGS. 10 and 11 illustrate this embodiment. FIGS. 10 and 11 illustrate lens 32 and video image tube 35 to which are directly affixed stabilizers 29 and 29a. The optical system made of lens 32 and image tube 25 is attached through pivots 37 and 37a to frame 38 which is in turn pivotably mounted to camera body 31 through pivots 39 and 39a. Pivots 37 and 39 and bracket 38 are representative of any gimbal or pivot setup which permits suspension of the optical system. When sensor 10 senses vibration of optical system 32/35 it applies a counterrotating reaction torque to 32/35. This effect is essentially independent of the motion of the body of the camera and thus increases the efficiency of the stabilization mechanism.

Although this invention has been described with reference to certain preferred embodiments, it will be appreciated by those skilled in the art that it can be varied without departing from its spirit and that these embodiments do not limit its scope, which is instead defined by the following claims.

What is claimed is:

1. A stabilizing mechanism for an optical system comprising an electromechanical torque sensor affixable to the optical system to detect vibration of the optical system about an axis and generate an electrical signal related to the detected vibration,
   an electric motor affixable to the optical system and capable of rotating a free flywheel mass about said axis, and
   a controller which measures the electrical signal from the electromechanical torque sensor and directs the motor to rotate the free flywheel mass so as to counteract the vibration detected by the electromechanical torque sensor.

2. The stabilizing mechanism in accordance with claim 1 further comprising a frame to which the electromechanical torque sensor and the electric motor are attached.

3. The stabilizing mechanism in accordance with claim 2 wherein the frame is affixable to the optical system.

4. The stabilizing mechanism in accordance with claim 1, further comprising a plurality of electromechanical torque sensors, motors and controllers so as to counteract vibration about a plurality of axes.

5. The stabilizing mechanism in accordance with claim 1, further comprising means for filtering the signal generated by the electromechanical torque sensor.

6. The stabilizing mechanism in accordance with claim 3, wherein the farme additionally comprises a handle for the operator of the optical system.

7. A stabilized optical system comprising an optical system in combination with a stabilizing mechanism, which mechanism comprises an electromechanical torque sensor affixed to the optical system to detect vibration of the optical system about an axis and generate an electrical signal related to the detected vibration,
   an electric motor affixed to the optical system and capable of rotating a free flywheel mass about said axis, and
   a controller which measures the electrical signal from the sensor and directs the motor to rotate the mass so as to counteract the vibration detected by the electromechanical torque sensor.

8. The stabilized optical system in accordance with claim 7 further comprising a frame to which the optical system, the electromechanical torque sensor, and the electric motor are attached.

9. The stabilized optical system in accordance with claim 7, further comprising a plurality of electromechanical torque sensors, motors, and controllers so as to counteract vibration about a plurality of axes.

10. The stabilized optical system in accordance with claim 7, further comprising means for filtering the signal generated by electromechanical torque sensor.

11. The stabilized optical system in accordance with claim 8, wherein the frame additionally comprises a handle for the operator of the optical system.

12. A stabilized optical system in accordance with claim 7, wherein the optical system is the lens and image tube of a video camera and the optical system and stabilizing mechanism are rotatably mounted within the body of the camera.

13. A stabilized optical system in accordance with claim 7, wherein the optical system is the lens and film holder of a film camera and the optical system and stabilizing mechanism are rotatably mounted within the body of the camera.

14. A method of stabilizing an optical system against vibration about an axis comprising the steps of
   a. detecting with an electromechanical torque detector vibration of the optical system about the axis and generating an electrical signal related to the detected vibration,
   b. measuring the electrical signal, and
   c. directing an electric motor affixed to the optical system with its shaft parallel to the axis to rotate a free flywheel mass so as to counteract the vibration detected by the sensor.

15. A stabilizing mechanism for an optical system comprising a meter movement electromechanical torque sensor affixable through a frame to the optical system to detect vibration of the optical system about an axis and generate an electrical signal related to the detected vibration,
   an electric motor affixable to the optical system through said frame and capable of rotating a free flywheel mass about said axis, and
   a controller which measures the electrical signal from the electromechanical torque sensor and directs the motor to rotate the free flywheel mass so as to counteract the vibration detected by the electromechanical torque sensor.

* * * * *